United States Patent
Baker et al.

(10) Patent No.: US 9,716,637 B1
(45) Date of Patent: Jul. 25, 2017

(54) COMMUNICATION STRING NETWORK

(71) Applicants: William Baker, Lebanon, IN (US); Ronald Kappeler, Batesville, IN (US)

(72) Inventors: William Baker, Lebanon, IN (US); Ronald Kappeler, Batesville, IN (US)

( * ) Notice: Subject to any disclaimer, the term of this patent is extended or adjusted under 35 U.S.C. 154(b) by 233 days.

(21) Appl. No.: 14/120,574

(22) Filed: Jun. 5, 2014

Related U.S. Application Data

(60) Provisional application No. 61/956,315, filed on Jun. 5, 2013.

(51) Int. Cl.
  G06F 15/173  (2006.01)
  H04L 12/26   (2006.01)
  H04L 12/28   (2006.01)

(52) U.S. Cl.
  CPC ........ *H04L 43/065* (2013.01); *H04L 12/2803* (2013.01); *H04L 12/2825* (2013.01); *H04L 43/08* (2013.01)

(58) Field of Classification Search
  CPC  H04L 12/2823–12/2838; H04L 43/06–43/065
  See application file for complete search history.

(56) References Cited

U.S. PATENT DOCUMENTS

| | | | |
|---|---|---|---|
| 7,158,525 B2 * | 1/2007 | Daffner | H04L 12/2602 340/531 |
| 2005/0188076 A1 * | 8/2005 | Rayburn | H04L 12/2803 709/224 |
| 2009/0287736 A1 * | 11/2009 | Shike | H04L 43/0811 |
| 2009/0309754 A1 * | 12/2009 | Bou | G01R 15/18 340/870.02 |
| 2010/0256788 A1 * | 10/2010 | Bourbeau | H05K 5/0017 700/90 |
| 2013/0066470 A1 * | 3/2013 | Wang | G05B 15/02 700/275 |
| 2013/0311634 A1 * | 11/2013 | Raymond | H04L 67/12 709/223 |

\* cited by examiner

*Primary Examiner* — Brendan Higa
(74) *Attorney, Agent, or Firm* — Darrin Wesley Harris

(57) ABSTRACT

A communication network employing a communicator, a string commander and a measurement string including one or more operational monitors. The string commander is in communication with the communicator and the operational monitor(s) in accordance with a serial communication protocol. In operation, each operational monitor measures one or more operational parameters of one of a system, a device or a sensor, and communicates the measurement(s) to the string commander. The string commander collects measurements of the operational parameter(s) of an associated measurement string and formats the measurements into the reportable format that is made available by the communicator to a workstation and/or a database.

17 Claims, 3 Drawing Sheets

COMMUNICATION STRING NETWORK

This non-provisional patent application claims a priority and a benefit of U.S. Provisional Patent Application Ser. No. 61/956,315, entitled "Communication String Network" and filed Jun. 5, 2013, to the extent the subject matter of this non-provisional patent application is found in the referenced provisional patent application.

The present invention generally relates to communication networks. The present invention specifically relates to communication networks implementing a serial communication protocol (e.g., Modbus, BACnet or LON) for monitoring various types of systems, devices and sensors/meters.

Communication networks facilitate the data communication of operational parameters of a system (e.g., an electric grid), a device (e.g., a pump) or a sensor/meter (e.g., a voltage meter, a flow meter, a gas meter, a temperature sensor) to a workstation and/or a database for detailed analysis of such operational parameters. To this end, the manner by which the communication network performs the data communication is important in terms of efficiency, reliability, complexity and costs. The present invention provides a communication network having maximal efficiency and reliability in the context of minimal complexity and costs.

One form of the present invention is a communication network employing a communicator, a string commander and a measurement string including one or more operational monitors. The string commander is in data communication with the communicator and the operational monitor(s) in accordance with a serial communication protocol (e.g., Modbus, BACnet or LON). In operation, each operational monitor measures one or more operational parameters of one of a system, a device, a sensor or a meter, and communicates the measurement(s) to the string commander. The string commander collects measurements of the operational parameter(s) of an associated measurement string and formats the measurements into a reportable format that is made available by the communicator to a workstation and/or a database.

The foregoing form and other forms of the present invention as well as various features and advantages of the present invention will become further apparent from the following detailed description of various exemplary embodiments of the present invention read in conjunction with the accompanying drawings. The detailed description and drawings are merely illustrative of the present invention rather than limiting, the scope of the present invention being defined by the appended claims and equivalents thereof.

Figure 1:
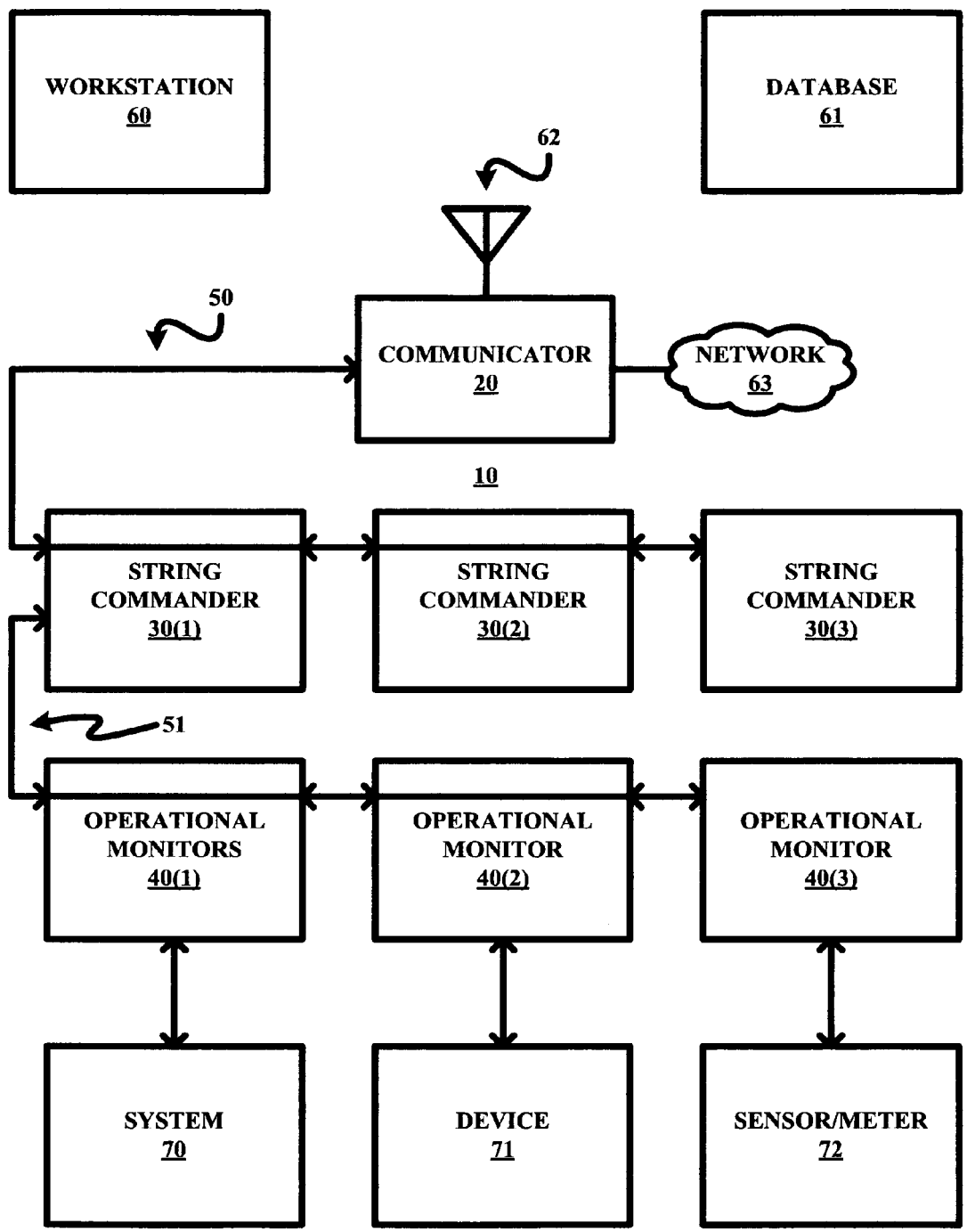
FIG. 1 illustrates a exemplary embodiment of a communication network in accordance with the present invention.

Referring to FIG. 1, a communication network 10 of the present invention employs a communicator 20 having a command chain 50 of X number of string commander(s) 30 with X≥1. Each string commander 30 has a measurement string 51 of which only the measurement string for string commander 30(1) is shown. Each measurement string 51 includes a Y number of operational monitor(s) 40, with Y≥1, of which three (3) operational monitors 40 are shown for the measurement string 51 of string commander 30(1). Each operational monitor 40 is connected to equipment including any type of system 70 (e.g., an electric grid), any type of device 71 (e.g., a pump) and any type of sensor/meter 72 (e.g., a voltage meter, a flow meter, a gas meter, a temperature sensor, etc.).

Figure 2:
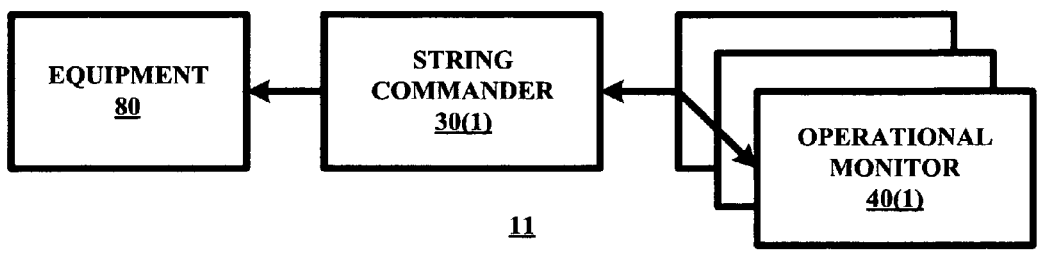
FIG. 2 illustrates a first exemplary embodiment of a communication sub-network in accordance with the present invention.
Figure 3:
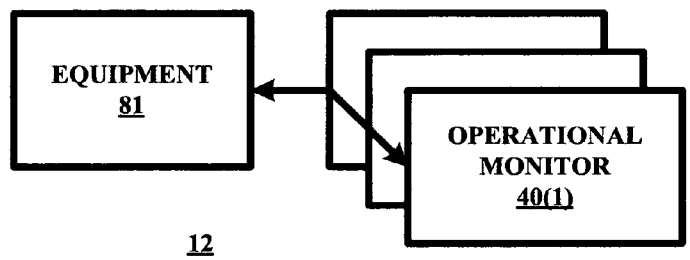
FIG. 3 illustrates a second exemplary embodiment of a communication sub-network in accordance with the present invention.

Alternatively or concurrently, one or more of string commanders 30 may be in data communication with equipment 80 (e.g., a machine, a tool, etc.) within a communication sub-network 11 as shown in FIG. 2, and/or one or more of operational monitors 40 may be in data communication with equipment 81 (e.g., a machine, a tool, etc.) within a communication sub-network 12 as shown in FIG. 3.

Furthermore, operational monitors 40 may connect to communicator 20 (FIG. 1), to an internal data logger or to master controller via BACnet/IP connection.

For purposes of the present invention, each operational monitor 40 is broadly defined herein as any device structurally configured for measuring one or more operational parameters of a system 70, a device 71 or a sensor/meter 72.

Figure 4:
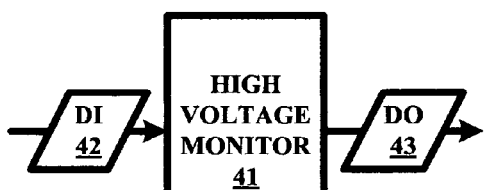
FIG. 4 illustrates an exemplary embodiment of a high voltage monitor in accordance with the present invention.
Figure 5:
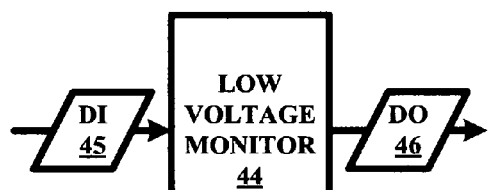
FIG. 5 illustrates an exemplary embodiment of a low voltage monitor in accordance with the present invention.

In one embodiment, an operational monitor 40 is a high voltage monitor designed to UL61010-1 measurement standard and is connectable to any single or three phase electrical circuits to measure phase voltage (e.g., 480 VAC), phase current, volt-amps, rate of change of current each phase, power factor and phase load balance. For example, as shown in FIG. 4, a high voltage monitor 41 has data inputs ("DI") 42 of high voltage and/or high current signals and data outputs ("DO") 43 to an associated string commander 30 via a Modbus cable, or to equipment 81 via a Modbus cable or a USB port (e.g., equipment 82 is a thumb drive).

In another embodiment, an operational monitor 40 is a low voltage monitor designed to UL61010-1 measurement standard and is connectable to a sensor/meter 72 (e.g., a voltage meter, a flow meter, a gas meter, a temperature sensor, etc.). For example, as shown in FIG. 45, a low voltage monitor 44 has data inputs ("DI") 45 of low voltage and/or low current signals from sensor/meter 72 and data outputs ("DO") 46 to an associated string commander 30 via a Modbus cable, or to equipment 81 via a Modbus cable or a USB port (e.g., equipment 82 is a thumb drive).

In practice, each operational monitor 40 may be alternatively or further structurally configured as a switch unit for transferring ON-OFF commands from a switch commander 40 to system 70, device 71 or sensor/meter 72, or for automatically controlling an ON-OFF operation of system 70, device 71 or sensor/meter 72 in accordance with predefined operational and/or environmental conditions.

Also in practice, each operational monitor 40 may be alternatively or further structurally configured as a digital controller for transferring digital control signals from a switch commander 40 to system 70, device 71 or sensor/meter 72.

For purposes of the present invention, each string commander 30 is broadly defined herein as any device structurally configured for operating a measurement string 51 in accordance with a serial communication protocol (e.g., Modbus, BACnet or LON). In operation, each string commander 30 and each operational monitor 40 is individually addressable whereby a string commander 30 may issue downstream control signals to operational monitors 40 and may collect upstream measurement data from operational monitors 40. By further operation, each string commander 40 formats the measurement data into a reportable format and provides a signal when emergency action is needed.

For purposes of the present invention, the term "reportable format" is broadly defined an any format for the display of output signals or derivatives thereof from a system 70, a device 71 and/or a sensor/meter 72. An example of reportable format include, but is not limited to, a numerical or scientific format of an engineering unit for a spreadsheet cell or cell array.

For purpose of the present invention, communicator 20 is broadly defined herein as any device structurally configured for making available measurement data of system 70, device 71 and/or sensor/meter 72 to a workstation 60 and/or a database 61 via a wireless communication network 62 (e.g., Wi-Fi) or a wired communication network 63 (e.g., a LAN). In practice, the measurement data may be made available to workstation 60 and/or database 61 in any reportable format. In one embodiment, the reportable format is a known spreadsheet cell format for optimizing, troubleshooting, preventative maintenance and assessments of efficiencies of electrical and fuel use of system 70, device 71 and/or sensor/meter 72. More particularly, each cell or cell array of data received by communicator 20 from string commanders 30 is inputted into a spreadsheet, which may be routinely made available to workstation 60 and/or database 61 per a defined schedule.

Figure 6:
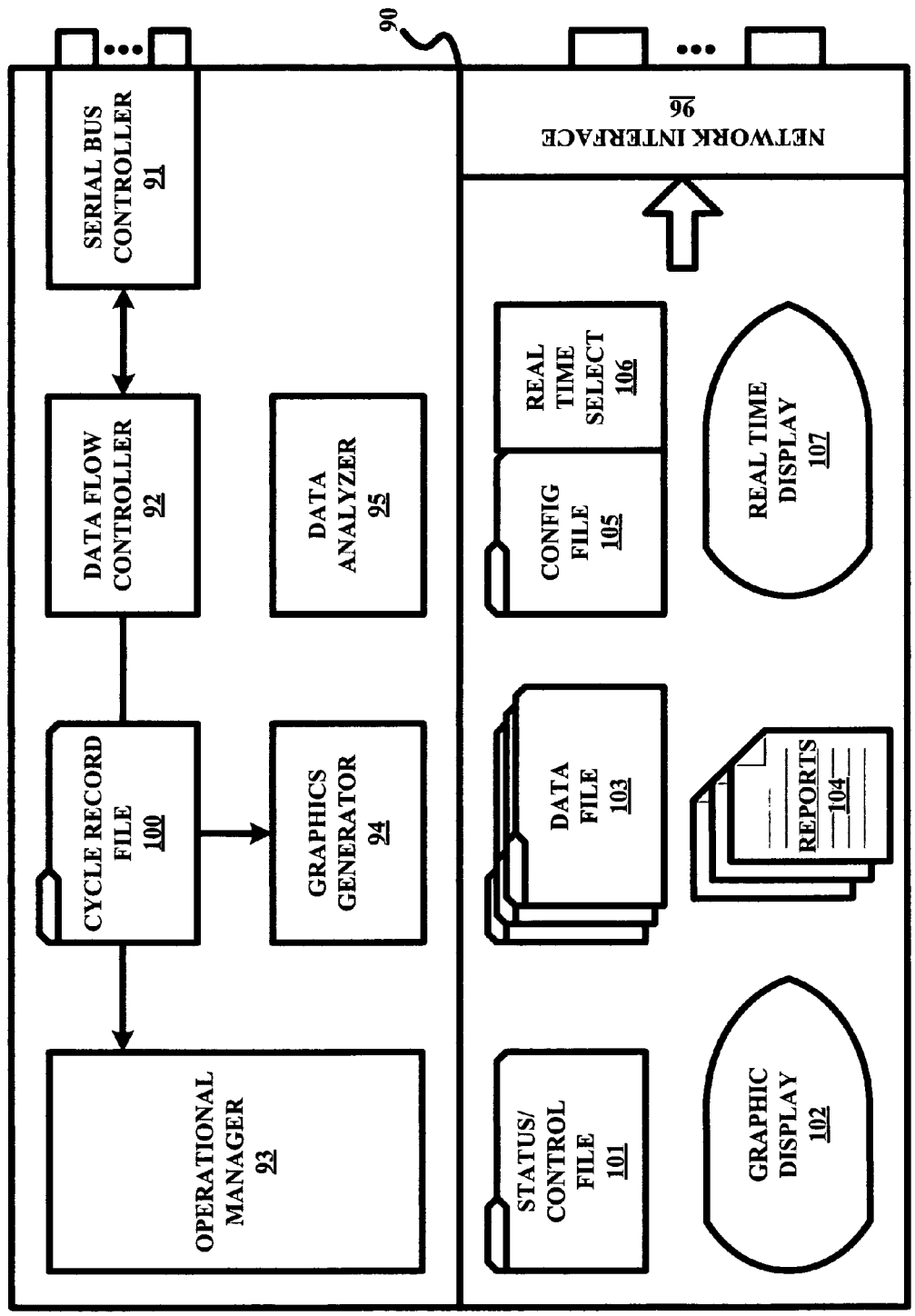
FIG. 6 illustrates an exemplary embodiment of a communicator in accordance with the present invention.

Referring to FIG. 6, one embodiment 90 of communicator 20 (FIG. 1) employs a serial bus controller 91 (e.g., a Modbus controller), a data flow controller 92, an operational manager 93, a graphic generator 94 and a data analyzer 95, and a network interface 96.

Serial data controller 91 implements interrogation cycles for sequentially processing serial data communications from/to one or more string commanders 30 (FIG. 1) or operational monitors 40 (FIG. 1) connected to serial bus controller 91.

For each cycle, data flow controller 92 controls the flow of the data communication via a cycle record file 100 to operational manager 93 and graphics generator 94 in accordance with a configuration ("config") file 105 defining a serial bus address and a sequential ordering for each connected string commander 30 and/or each connected operational monitor 40. In practice, the sequential ordering of each string commander 30 and/or each operational monitor 40 within configuration file 105 may be customized by an optional real time select 106 operable by a workstation 60 (FIG. 1) or database 61 (FIG. 2) connected to network interface 96.

Additionally, for a selected operational monitor 40, configuration file 105 may be customized to direct data flow controller 92 to control a real time display 107 of operational data from a particular string commander 30 or operational monitor 40.

For each cycle record file 100, operational manager 93 inputs the data communication into an overall status and control file 101. In one embodiment, status and control file 101 is a spreadsheet and each cycle record file 100 is a cell array of data to be recorded into the spreadsheet. In practice, operational manager 93 may employ control logic (not shown) for operating one or more systems 70 (FIG. 1), one or more devices 71 (FIG. 1), and/or one or more sensors/meters 72 whereby control commands (not shown) are communicated via serial bus controller 91 to the appropriate string commander 30 and/or operational monitor 40. More particularly, the control logic configures operational manager 93 as a management/automation system for a facility of any type (e.g., a building manager/automation system).

For each cycle record file 100, graphic generator 94 generates or updates a graphic display 102 of the data communication.

Data flow controller 92 further stores each cycle record file 100 within a data file 103 for each string commander 30 and/or operational monitor 40. Data analyzer 95 continually processes data files 103 to generate reports 104 representative of a particularly data analysis of a system 70, device 71, and sensors/meters 72. Example of the reports include, but are not limited to, a periodic data report, a file comparison report and an efficiency estimate report. Workstation 60 and database 61 are operated to manually or automatically review status/control file 101, graphic display 102, data file(s) 103, reports 104 and/or real time display 107.

Also, in practice, a string commander 30 as used in sub-network 11 (FIG. 2) and/or an operational monitor 40 as used in sub-network 12 (FIG. 3) may employ one or more of components 91-96 of communicator 90 (FIG. 6).

While various exemplary embodiments of the present invention have been illustrated and described, it will be understood by those skilled in the art that the exemplary embodiments of the present invention as described herein are illustrative, and various changes and modifications may be made and equivalents may be substituted for elements thereof without departing from the true scope of the present invention. In addition, many modifications may be made to adapt the teachings of the present invention without departing from its central scope. Therefore, it is intended that the present invention not be limited to the particular embodiments disclosed as the best mode contemplated for carrying out the present invention, but that the present invention includes all embodiments falling within the scope of the appended claims.

The invention claimed is:

1. A communication network, comprising:
   a communicator;
   a string commander in data communication with the communicator in accordance with a serial communication protocol;
   a measurement string including at least one operational monitor in data communication with the string commander in accordance with the serial communication protocol;
   wherein each one operational monitor measures at least one operational parameter of one of a system, a device and a sensor/meter;
   wherein the string commander collects measurements of the at least one operational parameter by the measurement string and formats the measurements into a reportable format; and
   wherein the communicator makes available the reportable format of the measurements from the string commander to at least one of a workstation and a database.

2. The communication network of claim 1, wherein the serial communication protocol is Modbus.

3. The communication network of claim 1, wherein the serial communication protocol is BACnet.

4. The communication network of claim 1, wherein the serial communication protocol is LON.

5. The communication network of claim 1, wherein the operational monitor is a high voltage monitor.

6. The communication network of claim 1, wherein the operational monitor is a low voltage monitor.

7. The communication network of claim 1, wherein the reportable format is a spreadsheet format.

8. The communication network of claim 1, wherein the communicator further makes available, to the at least one of the workstation and the database, at least one analytical report of the data communication between the string commander and the measurement string.

9. The communication network of claim 1, wherein the communicator further makes available, to the at least one of the workstation and the database, at least one data file of the data communication between the string commander and the measurement string.

10. The communication network of claim 1, wherein the communicator further makes available, to the at least one of the workstation and the database, at least one status and control file of the data communication between the string commander and the measurement string.

11. The communication network of claim 1, wherein the communicator further makes available, to the at least one of the workstation and the database, a graphic display of the data communication between the string commander and the measurement string.

12. The communication network of claim 1, wherein the communicator further makes available a graphic display of an operational monitor in real time to the workstation and the database.

13. The communication network of claim 1, wherein the communicator includes:

a serial bus controller communicating with the string commander in accordance with a serial bus address of the string commander.

14. The communication network of claim 1, further comprising:

at least one additional string commander in data communication with the communicator in accordance with the serial communication protocol.

15. The communication network of claim 14, wherein the communicator communicates with the string commanders in accordance with a sequential ordering of a serial bus address of each string commander.

16. The communication network of claim 14, wherein the communicator includes:

a data flow controller operable to control a cyclic serial flow of data communication from the string commanders.

17. The communication network of claim 16, wherein the data flow controller controls the serial cyclic flow of data communication in accordance with a sequential ordering of serial bus addresses of the string commanders.

\* \* \* \* \*